Feb. 6, 1968 F. W. DOWDICAN 3,367,539
WASTE LIFT PUMP WITH INLET CLEARING BY-PASS CONDUIT
Filed March 30, 1967

INVENTOR.
FRANK W. DOWDICAN though and the source of electrical energy is embodied in a cable. The cable extends from within the container to the source through an overlapping joint between planar members forming a container wall, providing a substantial length of wall material along the electric cable extending through the passage. Sealing material between the cable and passage wall completes a simple, yet efficient, structure to keep the container sealed about the cable.

United States Patent Office 3,367,539
Patented Feb. 6, 1968

3,367,539
WASTE LIFT PUMP WITH INLET CLEARING BY-PASS CONDUIT
Franklin W. Dowdican, Rte. 1, Talalla, Okla. 74080
Filed Mar. 30, 1967, Ser. No. 627,031
5 Claims. (Cl. 222—148)

ABSTRACT OF THE DISCLOSURE

A container is connected to a source of waste. The waste is ejected from the container by an electric-driven pump mounted in the container.

BACKGROUND OF THE INVENTION (1) *Field of the invention.*—The present invention relates to control of waste material deposited in a container. More particularly, the invention relates to digesting some of the solid waste for pumping and preventing the undigested solid waste from reducing the efficiency of pumping liquid and digested waste.

(2) *Description of the prior art.*—Pumps in waste containers have been provided with screens to prevent the pumping elements being clogged with undigested waste. Any upstream screen simply functions as a static arrestor of solid waste without dynamic digesting of the material. A static screen system is readily clogged, resulting in rapid loss of pumping efficiency by the lift system. The prior art system requires relatively close and frequent attention to clean the screen and the container of undigested waste which is too large to be ejected through the pump.

SUMMARY OF THE INVENTION

The present invention contemplates a by-pass connection in the outlet of a waste container to direct a predetermined portion of the pumped waste in a radial path within the container. The by-passed, or recirculated, waste is specifically formed into a high velocity stream which is directed across the exit of the container to keep this exit swept of solid waste which is not sufficiently digested to be passed through the exit. The arrangement results in the undigested solids being centrifuged to the wall of the container where they are digested by fluid agitation and attrition until sized small enough to flow along a radial path to the container exit. Further, no check valve function is provided in the system, resulting in a back flow of waste when withdrawal from the container is stopped. Bridging of the solid waste at the exit is thereby obviated.

The invention more specifically contemplates a lift pump mounted in a container which receives waste which is to be raised a certain distance for disposal. The inlet of the pump is generally located near the center of the floor of the container, and the outlet includes a by-pass connection which directs a portion of the pumped waste at a relatively high velocity stream in a sweeping action across the inlet. The direction given the by-passed waste forces all the waste in the container into a vortex in which the solids of the waste are reduced by fluid agitation and attrition to units small enough to be drawn toward the inlet at the center of the vortex to be pumped. Solid foreign material which is not reduced in this manner is maintained in isolation at the wall of the container by the centrifugal force of the vortex. A regular maintenance program is contemplated for manual removal of the isolated material from the container.

In a still more specific sense, the invention contemplates the pump unit mounted within the container and powered by an electric motor. The connection between the motor

DESCRIPTION OF THE PREFERRED EMBODIMENT

Figure 1:
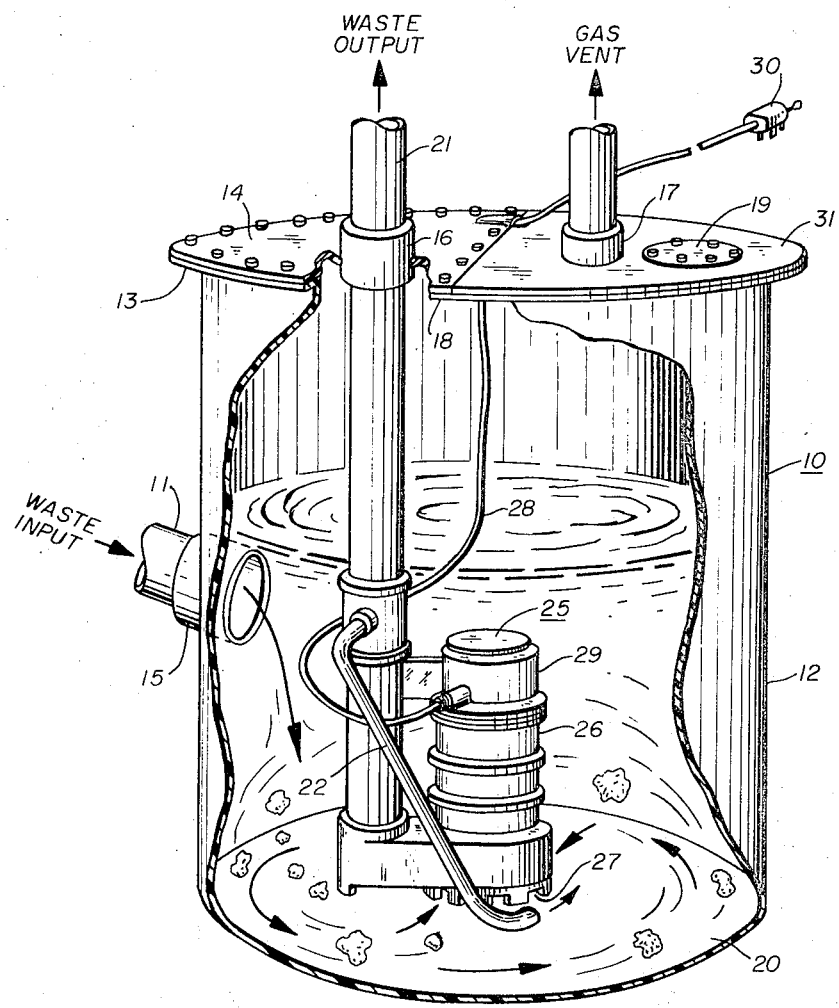
FIG. 1 is a sectional isometric elevation of a pump in a container with conduits, all embodying the present invention.

Referring to FIG. 1, there is disclosed a container 10 connected to inlet 11 from which liquid and solid waste is received. The container is usually placed at a level low enough to receive the liquid and solid material as it gravitates from multiple sources not indicated in this disclosure.

Container 10 is disclosed here as a form molded from a plastic material which will withstand the corrosive nature of the waste collected. Under present day technology, the basic housing 12 of container 10 can be shaped in one piece with a flange 13 on which can be mounted a cover 14. Suitable fittings 15, 16 and 17 are readily molded in place to form connections with the conduits communicating with the interior of the container.

The cover 14 is shown in two basic pieces, both mounted on flange 13 and registering with each other at junction 18. An access opening is provided at 19 for manual cleaning and inspection of the interior of the container.

The form of container housing 12 is preferably cylindrical. The waste material from inlet 11 drops to cylindrical bottom 20 and is removed through a discharge conduit 21 which extends through fitting 16 with its inlet arranged close to the center of bottom 20. A pressure drop is generated across the inlet of conduit 21 so liquid and properly sized solid waste material will flow from the container through the discharge conduit up to a predetermined level above the container.

The inlet of discharge conduit 21 is swept of solid material which is so large that it tends to bridge over the inlet and block discharge from the container. A stream of the material which has passed through the inlet is directed across the inlet to provide the sweeping function. More specifically, by-pass conduit 22 is connected to conduit 21 downstream of the inlet to conduit 21 and extended back down to the conduit 21 inlet. The force of the differential pressure generated across the inlet of conduit 21 ejects a portion of the material passed through the inlet back down to the bottom 20 and across the inlet. The size of this high velocity stream is determined by the size of by-pass conduit 22 relative to the discharge conduit 21.

The outlet end of by-pass conduit 22 is directed across the inlet of discharge conduit 21. Also, the direction of the sweeping flow is made tangential to the cylindrical wall of the container 10. This arrangement provides for the liquid and solid material to be formed into a vortex about the centrally positioned inlet of conduit 21. The vortex is made intense enough by this arrangement that solid waste material is digested by fluid agitation and attrition.

The swirling vortex of waste in the lower portion of the container not only grinds the large pieces of waste into smaller pieces but keeps the large material which will not reduce in size isolated against the wall of the container. The material which does digest (reduce in size) eventually is drawn into the inlet of conduit 21. Therefore, this grading process separates the solids within the container and keeps the solids which can not be reduced isolated by centrifugal force until removed through opening 19.

When the differential pressure generated across the inlet of conduit is removed, the head of waste remaining in conduit 21, up to its point of discharge, flows back into container 10. This back flow will provide additional flushing action at the inlet of conduit 21 to break any bridging of solid material which may have accumulated despite the sweeping flow from conduit 22. To provide this back flow, all check valve structure is eliminated in conduit 21. Therefore, when the differential pressure is removed, there is no obstruction to the back flow. True, the head must be regained by the differential pressure generated, but the benefit of the additional flushing is fair exchange for the power expended.

Up to this point, in connection with FIG. 1, the differential pressure across the inlet of conduit 21 has been discussed as generated by some general structure. The embodiment of FIG. 1 discloses an electric-driven, vane-type, pump 25 as a specific structure to provide the differential pressure.

Pumps of this general type are well known as sump pumps. The motor 26 is protected for complete immersion by a liquid-tight housing. The apparatus is mounted on the end of a discharge conduit, such as conduit 21, the inlet of the conduit becoming the inlet of the pump.

The inlet of the pump is formed by a series of openings 27 between legs arranged about the impeller of pump 25. As a series of openings 27 this structure becomes a coarse strainer through which solid material of large size cannot pass to jam, or injure, the impeller of the pump. As previously indicated in a general way, no check valve is included in association with the pump 25 or the conduit 21 which will be a mechanical impediment to back flow of pumped waste when the pump is stopped.

SEAL STRUCTURE FOR THE ELECTRIC CABLE

Figure 2:
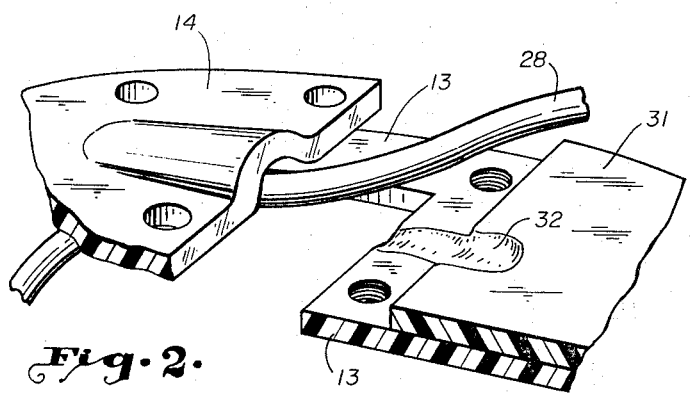
FIG. 2 is an exploded isometric view of the wall panels of the container at which a joint is formed about the cable.

FIG. 2 discloses the essential features of a seal structure in the container cover for the electric power cable of the pump motor. The sump pump impeller is rotated by an electric motor, located in the housing at 26. The electric cable 28 connects switch gear in housing 29 and a source of power not shown. Plug 30 is shown on the end of the conductor 28 which is external the container 10, ready to be engaged with the power source. The seal structure solves the problem of passing the conductor 28 through the walls of container 10.

The cover parts may be given various forms. For example, portion 31 may be bonded to flange 13 and the second portion 14 bolted to the flange as shown in FIG. 1. The flange 13 may be formed as a separate item which is bonded to the top rim of the wall of container housing 12. In all variations, the present invention anticipates at least two cover parts coming together at a line. Mating formations of the cover parts themselves form a passage with a substantial length of wall for engagement with the external surface of the conductor 28.

If the viewer will orient himself with the container as disclosed in FIG. 1, the lower edge of portion 14 and the upper edge of portion 31 are seen to be moulded with matching configurations which provide a passage extending through the cover at a small angle to the horizontal. The lower portion of this passage wall is viewed at 32 in this exploded view of the structure. The complete wall provides a substantial surface area to engage a corresponding external surface area of the conductor 28. The very size of the mating surface areas promotes an excellent seal about the conductor. Adhesive between the surfaces will add to the efficiency of this seal about the conductor. Bolts on each side of the passage bring the mating configuration together sealing with a mechanical force which gives still further strength to the seal at this point in the container cover.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A lift system, including,
   a container connected to receive a liquid and solid material,
   a discharge conduit connected to the container with its inlet arranged close to the center of the bottom of the container,
   means for generating a pressure drop across the inlet of the container so liquid and properly sized solid material will flow from the container through the discharge conduit up to a predetermined level above the container,
   and a by-pass conduit connected to the discharge conduit and arranged to direct a portion of the flow from the inlet back across the inlet to sweep solid material from the inlet which would tend to bridge over the inlet and block discharge from the container.

2. The lift system of claim 1 in which,
   the by-pass conduit is directed across the inlet and tangentially to the container wall to create a vortex of the liquid and solid material in which the solid material is digested by fluid agitation and attrition.

3. The lift system of claim 1 in which,
   the by-pass conduit is directed with relation to the wall so as to create a vortex of the liquid and solid material in which solid material which will not digest by fluid agitation and attrition will be kept against the wall in isolation from the inlet and from which it can be manually removed.

4. The lift system of claim 1 in which,
   the means generating the pressure drop is an electric-driven pump and the by-pass conduit is connected by one end to the discharge conduit downstream of the pump with the other end at the inlet to the pump.

5. The lift system of claim 3 in which,
   the discharge conduit and pump are constructed without mechanical impediment to back-flow when the pump is stopped in order that the back flow of liquid from the discharge conduit will sweep any accumulation of solids from the inlet which tends to bridge the inlet.

References Cited

UNITED STATES PATENTS

| | | | |
|---|---|---|---|
| 1,091,401 | 3/1914 | Smith | 222—385 |
| 2,022,232 | 11/1935 | Davis. | |
| 2,160,028 | 5/1939 | Moore | 222—189 X |
| 2,267,897 | 12/1941 | Carrico. | |
| 2,368,529 | 1/1945 | Edwards | 222—385 |
| 2,689,670 | 9/1954 | Smith | 222—318 |
| 3,227,326 | 1/1966 | Beamer | 222—385 X |

SAMUEL F. COLEMAN, *Primary Examiner.*